United States Patent
Tomioka

(10) Patent No.: US 7,550,712 B2
(45) Date of Patent: Jun. 23, 2009

(54) OPTICAL SCANNING SYSTEM WITH REDUCED SPHERICAL ABERRATION AND IMAGE FORMING APPARATUS USING THE SAME

(75) Inventor: Yuichi Tomioka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/583,828

(22) Filed: Oct. 20, 2006

(65) Prior Publication Data

US 2007/0091402 A1    Apr. 26, 2007

(30) Foreign Application Priority Data

Oct. 20, 2005 (JP) .............................. 2005-305795

(51) Int. Cl.
H01J 3/14 (2006.01)
H01J 5/16 (2006.01)
H01J 40/14 (2006.01)

(52) U.S. Cl. .................. 250/234; 359/197; 359/215; 359/216; 347/259

(58) Field of Classification Search ......... 359/196–226; 250/208.1, 234; 347/259–261
See application file for complete search history.

(56) References Cited

U.S. PATENT DOCUMENTS

| 6,833,940 | B2 * | 12/2004 | Suzuki et al. ............... 359/204 |
| 7,050,210 | B2 | 5/2006 | Atsuumi ..................... 359/223 |
| 7,142,339 | B2 | 11/2006 | Tomioka ..................... 359/204 |
| 7,336,406 | B2 | 2/2008 | Kato .......................... 359/204 |
| 7,362,486 | B2 | 4/2008 | Hayashi et al. ............. 359/205 |
| 2003/0128440 | A1 * | 7/2003 | Kimura ....................... 359/717 |
| 2004/0001241 | A1 * | 1/2004 | Hayashi et al. ............. 359/216 |
| 2004/0156084 | A1 * | 8/2004 | Takayama ................... 359/196 |
| 2005/0094233 | A1 * | 5/2005 | Tomioka ..................... 359/204 |
| 2005/0225819 | A1 * | 10/2005 | Atsuumi et al. ............. 359/205 |
| 2007/0081152 | A1 * | 4/2007 | Amada ...................... 356/237.3 |

FOREIGN PATENT DOCUMENTS

JP          11-6954         1/1999

\* cited by examiner

*Primary Examiner*—Thanh X Luu
*Assistant Examiner*—Francis M Legasse, Jr.
(74) *Attorney, Agent, or Firm*—Fitzpatrick, Cella, Harper & Scinto

(57) ABSTRACT

An optical scanning system and an image forming apparatus having the same. The optical scanning system includes a light source, a deflector, an input optical system for directing a light beam from the light source to the deflector, and an imaging optical system for directing the light beam deflected by the deflector onto a surface to be scanned. The input optical system includes a first optical element having a power both in a main-scan sectional plane and in a sub-scan sectional plane, and a second optical element having a power in the sub-scan sectional plane. At least one surface of the first optical element has a shape being rotationally asymmetrical and, in the sub-scan sectional plane, being non-arcuate.

8 Claims, 11 Drawing Sheets

---- S.A. IN MAIN SCAN DIRECTION
—— S.A. IN SUB-SCAN DIRECTION

OPTICAL SCANNING SYSTEM WITH REDUCED SPHERICAL ABERRATION AND IMAGE FORMING APPARATUS USING THE SAME

FIELD OF THE INVENTION AND RELATED ART

This invention relates to an optical scanning system and an image forming apparatus using the same. The present invention is effectively applicable to an image forming apparatus such as a laser beam printer or a digital copying machine having an electrophotographic process or a multi-function printer, for example.

In optical scanning systems, a light flux (light beam) which is optically modulated by a light source means in accordance with an imagewise signal and which emerges therefrom is periodically deflected by means of an optical deflector that comprises a polygonal mirror, for example. The light beam deflected by the optical deflector is then collected into a spot-like shape upon the surface of a photosensitive recording medium, through an imaging optical system having an f-θ characteristic. With this light beam, the recording medium surface is scanned, by which image recording thereon is carried out.

Recently, in image forming apparatuses such as laser printers, digital copying machines and multi-function printers, for example, the speed of image formation has increased on one hand and the machine size has decreased on the other hand. As a result of this, in relation to optical scanning systems as well, increasing the speed and decreasing the structure size have been desired.

As the speed increases, the quantity of light to be outputted from the light source means to sensitize (expose) a photosensitive surface increases. However, laser light sources that can produce a large light quantity have a structure which is more complicated as compared with that of laser light sources that produce a smaller light quantity. Hence, in order to obtain a higher speed while using a laser light source of small light quantity, the light-entrance side F number ($F_{no}$) of an input optical system that directs the light beam from light source means to an optical deflector is made brighter (smaller) to thereby increase the coupling efficiency.

When the F number in a sub-scan direction is bright, large spherical aberration would be produced from a cylindrical lens (cylinder), which is one of the components of the input optical system and which has a power (refractive power) only in the sub-scan sectional plane (sub-scan direction). If this occurs, the diameter of the beam spot on a surface to be scanned, with respect to the sub-scan direction, expands. If the beam spot diameter expands, it adversely affects an image drawn on the scanned surface, such as deterioration of resolving power or broadening of fine lines, for example.

Particularly, in recent years, an over-filled optical system (OFS: Over Filled Scanner) in which a light beam having a width larger than the width of the deflecting surface of an optical deflector, in a main-scan sectional plane, is inputted so as to achieve a higher image forming speed, is used in many applications. In such OFS machines, the F number in the main-scan direction is made larger so as to keep the light quantity distribution small and, on the other hand, the F number in the sub-scan direction is made smaller for higher coupling efficiency. As a result of this, however, the spherical aberration within the sub-scan sectional plane would be large.

Optical scanning systems having measures for correcting such spherical aberration have been proposed. An example is Patent Document No. 1, as follows.

[Patent Document No. 1]:
Japanese Laid-Open Patent Application, Publication No. 11-6954.

In the structure disclosed in the aforementioned Patent Document No. 1, one lens surface of a cylindrical lens is made with a non-arcuate shape, in the sub-scan sectional plane, so as to compensate the spherical aberration in the sub-scan sectional plane (sub-scan direction) as produced by an imaging optical system.

As a method for making the lens surface into such non-arcuate shape, generally, a glass cutting and polishing process, a glass molding process and a plastic molding process, for example, are known.

However, the glass cutting and polishing process and the glass molding process have difficulties that the lens production is not easy as compared with production of a glass lens or a plastic lens having arcuate shape, and the production cost increases considerably.

Furthermore, plastic lenses have a problem that, since the reflective index easily changes with a change of environment (particularly, temperature change), a focus error occurs upon the surface to be scanned when the temperature rises, this resulting in failure of good light spot. The larger the power of that lens is, the larger the amount of such focus error is. Therefore, if a cylindrical lens having a large power is used in an attempt to reducing the optical path length of the input optical system, for example, the amount of focus error would be quite large and hence the light spot would be deteriorated extremely.

SUMMARY OF THE INVENTION

It is accordingly an object of the present invention to provide an optical scanning system and/or an image forming apparatus using the same, by which at least one of the inconveniences described above, can be removed or reduced.

It is another object of the present invention to provide an optical scanning system and/or an image forming apparatus using the same, by which spherical aberration in a sub-scan sectional plane, produced by an input optical system, can be reduced or compensated such that a good light spot can be produced on the surface to be scanned and that a precise and quality image can be produced easily.

In accordance with an aspect of the present invention, to achieve at least one of these objects, there is provided an optical scanning system, comprising: light source means; deflecting means; an input optical system for directing a light beam from said light source means to said deflecting means; and an imaging optical system for directing the light beam deflected by said deflecting means onto a surface to be scanned; wherein said input optical system includes a first optical element having a power both in a main-scan sectional plane and in a sub-scan sectional plane, and a second optical element having a power in the sub-scan sectional plane, and wherein at least one surface of said first optical element has a shape being rotationally asymmetrical and, in the sub-scan sectional plane, being non-arcuate.

In one preferred form of this aspect of the present invention, the power of said second optical element is larger than that of said first optical element.

The first optical element may be configured to produce, in the sub-scan sectional plane, wavefront aberration effective to reduce spherical aberration to be produced by said second optical element.

When an F number of said input optical system is denoted by $F_{no}$, a relation $F_{no} \leq 4$ may be satisfied.

With respect to each of the main-scan sectional plane and the sub-scan sectional plane, said first optical element may be configured to compensate spherical aberration of said input optical system, independently of the other.

The light beam incident on a deflecting surface of said deflecting means may have a width larger than that of said deflecting surface with respect to a main-scan direction.

In an order from said light source means, said second optical element and said first optical element may be disposed in the named order.

At least one surface of said first optical element may have a non-arcuate shape in the main-scan sectional plane.

One surface of said first optical element may have a shape being rotationally asymmetrical and, in the sub-scan sectional plane, being non-arcuate, and another surface of said first optical element may have a shape being rotationally symmetrical.

At least one surface of said first optical element may have a shape being flat in the main-scan sectional plane and being non-arcuate in the sub-scan sectional plane.

Each of said first and second optical elements may comprise a lens.

The first optical element may be configured to produce, in the sub-scan sectional plane, wavefront aberration effective to reduce spherical aberration to be produced by a whole optical system of said optical scanning system.

At least one surface of said first optical element may comprise a surface having the same curvature radius in the main-scan sectional plane and in the sub-scan sectional plane, and yet, in the sub-scan sectional plane, an aspherical coefficient may be added to the curvature radius.

The first optical element may have a surface having the same curvature radius in the main-scan sectional plane and in the sub-scan sectional plane, and, in the main-scan sectional plane and the sub-scan sectional plane, different aspherical coefficients may be added to the curvature radius.

When said first optical element has a focal length in the sub-scan sectional plane as denoted by $f_{col}$ and said second optical element has a focal length in the sub-scan sectional plane as denoted by $f_{cyl}$, a relation $|f_{col}|/|f_{cyl}| \geq 5$ may be satisfied.

When a point of intersection between a curved surface of said first optical element and an optical axis of said input optical system is taken as an origin, a direction of the optical axis of said input optical system is taken as X axis, an axis orthogonal to the optical axis of said input optical system in the main-scan sectional plane is taken as Y axis, and an axis orthogonal to the optical axis of said input optical system in the sub-scan sectional plane is taken as Z axis, said first optical element may have a lens surface shape that satisfies the following relations:

$$Ui \times A < 0$$

$$A = (S_1 - S_1')$$

where Ui is a function that takes Ui=1 when concerned with a light-entrance side of said first optical element and that takes Ui=−1 when concerned with a light-exit side of said first optical element; $\underline{A}$ is an amount of sag, in the sub-scan sectional plane, of a non-arcuate anamorphic surface from an arcuate surface with respect to a Z coordinate through which a marginal light ray of the light beam passes; $S_1$ is an X coordinate, in the sub-scan sectional plane, at the point of intersection between the marginal light ray of the light beam and the non-arcuate anamorphic surface; and $S_1'$ is an X coordinate, in the sub-scan sectional plane, at the point of intersection between the marginal light ray and an arcuate surface upon which the non-arcuate anamorphic surface, with respect to the Z coordinate, at the point of intersection between the marginal light ray of the light beam and the non-arcuate anamorphic surface is based.

In accordance with another aspect of the present invention, there is provided an image forming apparatus, comprising: an optical scanning system as recited above; a photosensitive material disposed at a scan surface to be scanned; a developing device for developing an electrostatic latent image formed on said photosensitive material through a light beam scanned by said optical scanning system, to produce a toner image; a transferring device for transferring the developed toner image onto a transfer material; and a fixing device for fixing the transferred toner image, on the transfer material.

In accordance with a further aspect of the present invention, there is provided an image forming apparatus, comprising: an optical scanning system as recited above; and a printer controller for converting code data supplied from an outside machine into an imagewise signal and for inputting the imagewise signal into said optical scanning system.

In accordance with a yet further aspect of the present invention, there is provided a color image forming apparatus, comprising: an optical scanning system as recited in claim 1; and a plurality of image bearing members each being disposed at a scan surface to be scanned by said optical scanning system, for forming images of different colors.

The color image forming apparatus may further comprise a printer controller for converting a color signal supplied from an outside machine into imagewise data of different colors and for inputting the imagewise data into corresponding optical scanning systems.

Briefly, in accordance with the present invention, spherical aberration to be produced by the input optical system can be reduced, and a good light spot can be produced on the surface to be scanned. Hence, the present invention provides an optical scanning system and an image forming apparatus using the same, by which high precision and quality images can be easily produced through a simple structure.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
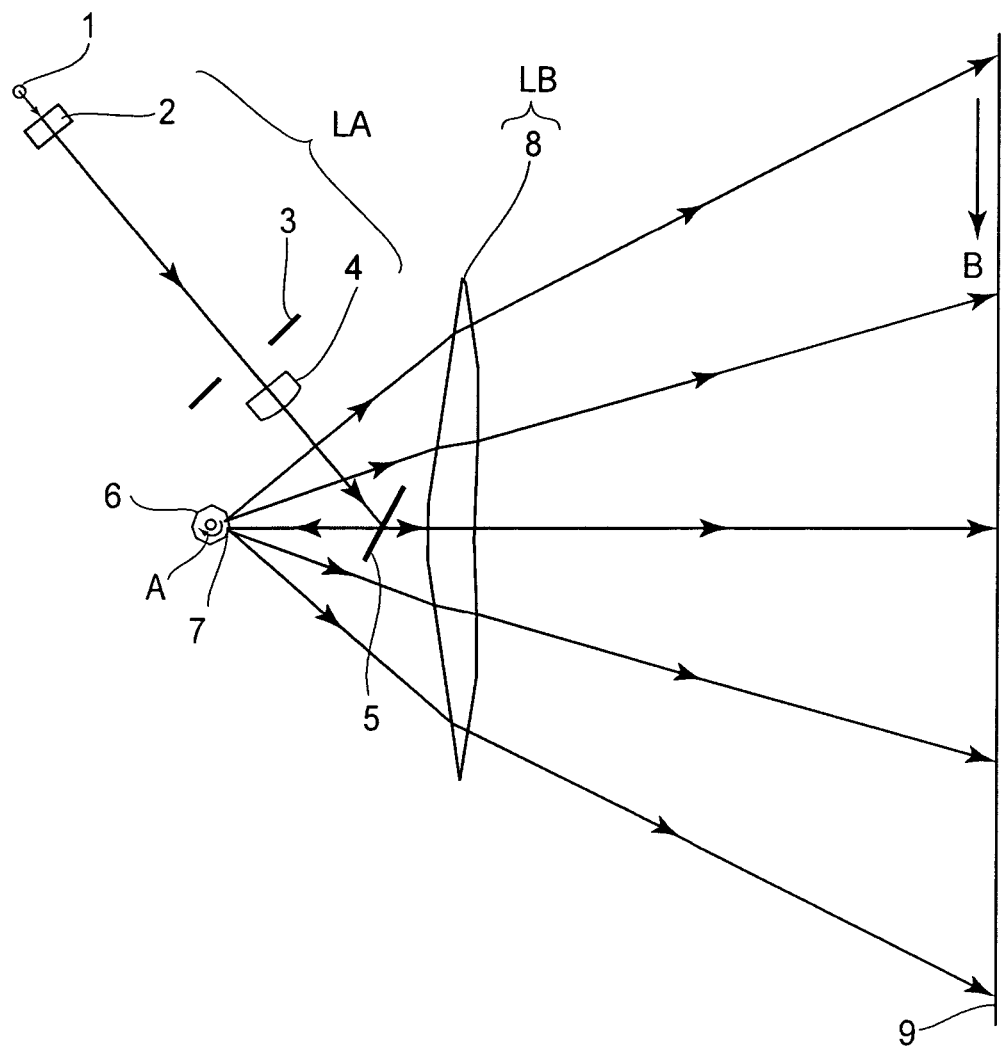
FIG. 1 is a sectional view, along a main-scan sectional plane, of an optical scanning system according to first to third embodiments of the present invention.
Figure 2:
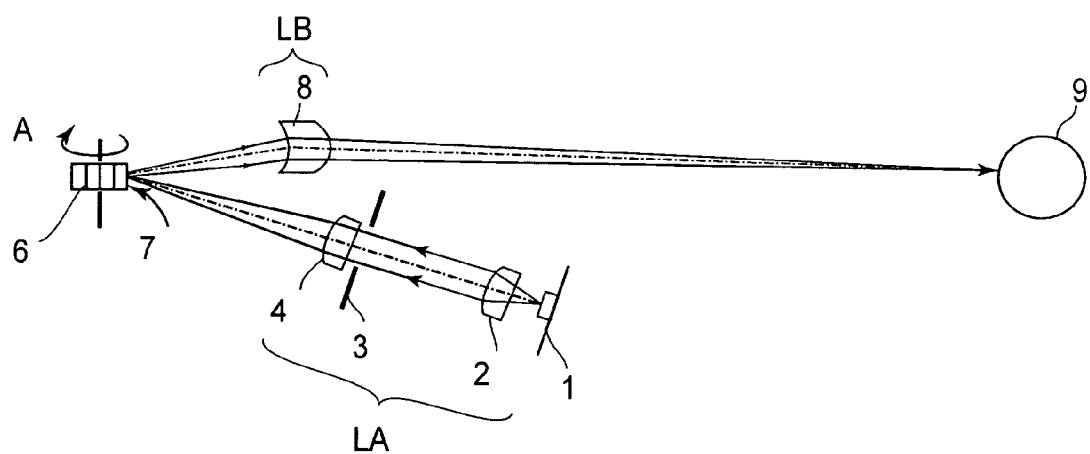
FIG. 2 is a sectional view, along a sub-scan sectional plane, of the optical scanning system according to the first to third embodiments of the present invention.

FIG. 1 is a sectional view along a main-scan direction (main-scan sectional plane) of a main portion of a first embodiment of the present invention. FIG. 2 is a sectional view along a sub-scan direction (sub-scan sectional plane) of the same.

Here, in FIG. 2, for better understanding, a flat mirror 5 shown in FIG. 1 is not illustrated and, therefore, the light path shown there is not bent by the flat mirror 5.

In this specification, the term "main-scan direction" refers to a direction which is perpendicular to the rotational axis of a rotary polygonal mirror and to the optical axis of an imaging optical system (that is, a direction in which a light beam is reflectively deflected (deflectively scanned) by the rotary polygonal mirror). The term "sub-scan direction" refers to a direction which is parallel to the rotational axis of the rotary polygonal mirror. The term "main-scan sectional plane" refers to a plane that contains the main-scan direction and the optical axis of the imaging optical system. The term "sub-scan sectional plane" refers to a plane which is perpendicular to the main-scan sectional plane.

In FIGS. 1 and 2, denoted at 1 is a light source means which may comprise, for example, a monolithic multi-beam semiconductor laser having a plurality of light emitting portions (light emission points).

Denoted at 2 is a lens system as a second optical element, and it may comprise an anamorphic lens, such as a cylindrical lens, having a predetermined power (refractive power) mainly only in the sub-scan sectional plane (sub-scan direction).

In this embodiment, the cylindrical lens 2 is made of a glass material, and it functions to transform a divergent light flux emitted from the light source means 1 into a parallel light flux in the sub-scan sectional plane.

Denoted at 3 is an aperture (aperture stop) having a function for shaping the light beam emerging from the cylindrical lens 2, into an optimum beam shape desired.

Denoted at 4 is a collective optical system as a first optical element, and it may comprise a converging or collecting lens such as a collimator lens having a power both in the main-scan sectional plane and in the sub-scan sectional plane.

In this embodiment, the collecting lens 4 is made of a plastic material (resin material), and it functions to collimate a divergent light flux emitted from the light source means 1 into the main-scan direction (that is, it transforms the light beam into a parallel light flux, a convergent light flux or a divergent light flux in the main-scan sectional plane). Furthermore, the collecting lens 4 has an additional function for imaging the light beam emerging from the cylindrical lens 2, upon a deflecting surface (reflecting surface) of an optical deflector 6 (to be described later) as a linear image extending in the main-scan direction.

In this embodiment, the cylindrical lens 2 and the collecting lens 4 are disposed in this order, from the light source means 1 side.

Here, the cylindrical lens 4 and the collecting lens 4 are components of an input optical system LA. The input optical system LA comprises two lens elements, that is, the cylindrical lens 2 and the collecting lens 4, but the input optical element LA may further include optical elements such as a flat mirror or flat-surface glass member, in addition to these lens elements.

In this embodiment, through this input optical system LA, a plurality of light beams emitted from the light source means 1 are projected upon the deflecting surface 7 of the optical deflector 6, in the main-scan sectional plane, with a light beam width greater than the width of the deflecting surface 7 (i.e., OFS: Over Filled Scanner).

Denoted at 6 is the optical deflector as a deflecting means, and it may comprise a polygonal mirror (rotary polygon). The polygonal mirror 6 can be rotated by driving means such as a motor (not shown) in a direction of an arrow A in the drawing and at a constant speed.

Denoted at LB is an imaging optical system having a light collecting function and an f-θ characteristic. It may comprise a single imaging lens (f-θ lens) 8 having a positive power (refractive power) both in the main-scan sectional plane and in the sub-scan sectional plane. The imaging optical system LB functions to image the light beam, reflectively deflected by the optical deflector 6 and based on imagewise information, in the main-scan sectional plane and as a light spot upon the surface of a photosensitive drum surface (surface to be scanned) 9. The imaging optical system LB has an additional function for providing an optically conjugate relationship, in the sub-scan sectional plane, between the deflecting surface 7 of the optical deflector 6 and the photosensitive drum surface 9, to thereby compensate any surface tilt of the deflecting surface.

Denoted at 9 is the photosensitive drum surface (recording medium surface) as the surface to be scanned.

In this embodiment, a plurality of light beams from the multi-beam semiconductor laser 1, having been optically modulated in accordance with imagewise information, enter the cylindrical lens 2 by which a predetermined power is given to them only with respect to the sub-scan sectional plane. Within the main-scan sectional plane, these light beams are transformed into divergent beams, while in the sub-scan sectional plane they are transformed into parallel beams. The light beams emerging from the cylindrical lens 2 pass through the aperture stop 3 (a portion of the beam may be blocked thereby), and they enter the collecting lens 4. The light beams passing though the collecting lens 4 are then incident on the deflecting surface 7 of the optical deflector 6 as a slightly converging light beam in the main-scan sectional plane, with a width greater than the width of the deflecting surface 7 in the main-scan direction (i.e. as over-filled optical system (OFS)). Thus, each light beam is imaged upon the deflecting surface 7 of the optical deflector 6 as a linear image extending in the main-scan direction.

Here, with respect to the main-scan sectional plane, each of the light beams emerging from the collecting lens 4 is projected upon the deflecting surface 7 just from the front of the optical deflector 6; that is, in the main-scan direction with respect to the optical deflector 6, it is projected from the center of the scan range, namely, the center of the scan range along the main-scan direction. Furthermore, with regard to the sub-scan sectional plane, it is projected from obliquely below, with a predetermined angle.

The light beams having been partially reflectively deflected by the deflecting surface 7 of the optical deflector 6 are then directed to the photosensitive drum surface 9 through the imaging optical system LB. By rotating the optical deflector 6 in the direction of an arrow A, the photosensitive drum surface 9 is optically scanned in the direction of an arrow B (main-scan direction), whereby imagewise information is recorded thereon.

In this embodiment, in order to reduce a light quantity distribution which is peculiar to an OFS system, the light-entrance side F number of the input optical system LA in the main-scan direction is made as large as 14, while on the other hand, for better coupling efficiency, the light-entrance side F number of the input optical system LA in the sub-scan direction is made as small as 4.

Thus, in this embodiment, where the light-entrance side F number of the input optical system LA in the sub-scan direction is denoted by $F_{no}$, a relation $F_{no} \leqq 4$ is satisfied.

The lower limit for this F number $F_{no}$ may be about $2 \leqq F_{no}$.

The spherical aberration produced by the cylindrical lens 2 in the sub-scan sectional plane (sub-scan direction) increases like a quadratic function as the light-entrance side F number of the input optical system LA in the sub-scan direction decreases. For this reason, if the light-entrance side F number in the sub-scan direction is 4 or less as in this embodiment, large spherical aberration will be produced by the cylindrical lens in the sub-scan sectional plane. Such a large spherical aberration in the sub-scan sectional plane will cause enlargement of the light spot upon the scan surface 9 and deterioration of the image quality.

In this embodiment, in consideration of this, the first surface (light entrance surface) of the collecting lens 4 is defined by an anamorphic surface which has a flat surface shape with regard to the main-scan sectional plane while, on the other hand, with regard to the sub-scan sectional plane, which is rotationally asymmetrical and non-arcuate. Furthermore, the second surface (light exit surface) of the collecting lens 4 is defined by a spherical shape with respect to the main-scan sectional plane and the sub-scan sectional plane.

With this arrangement, the collecting lens 4 produces wavefront aberration that effectively cancels the spherical aberration in the sub-scan sectional plane produced by the cylindrical lens 2, such that the spherical aberration of the cylindrical lens 2 can be well compensated.

Figure 3A:
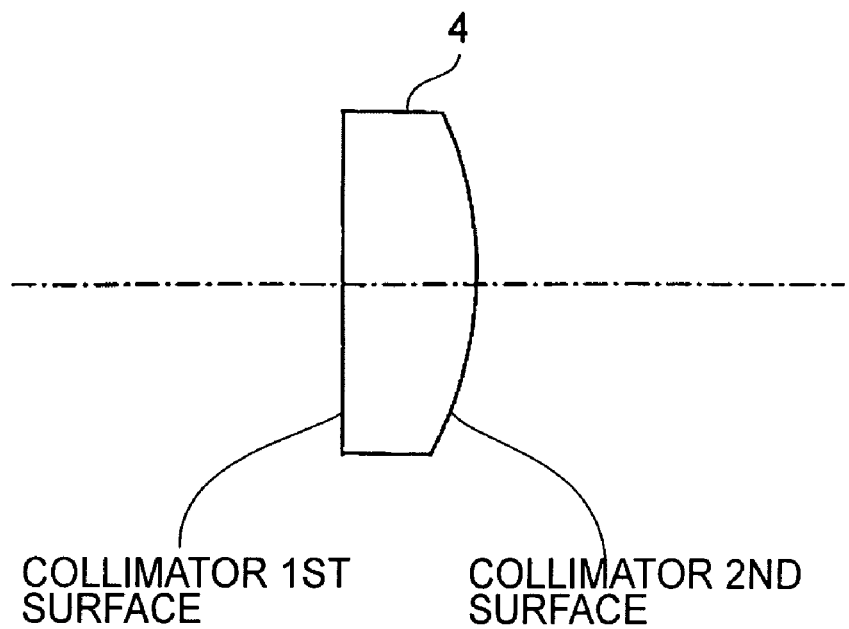
FIGS. 3A and 3B are sectional views, along the main-scan sectional plane and the sub-scan sectional plane, respectively, of a light collecting lens used in the first embodiment of the present invention.
Figure 3B:
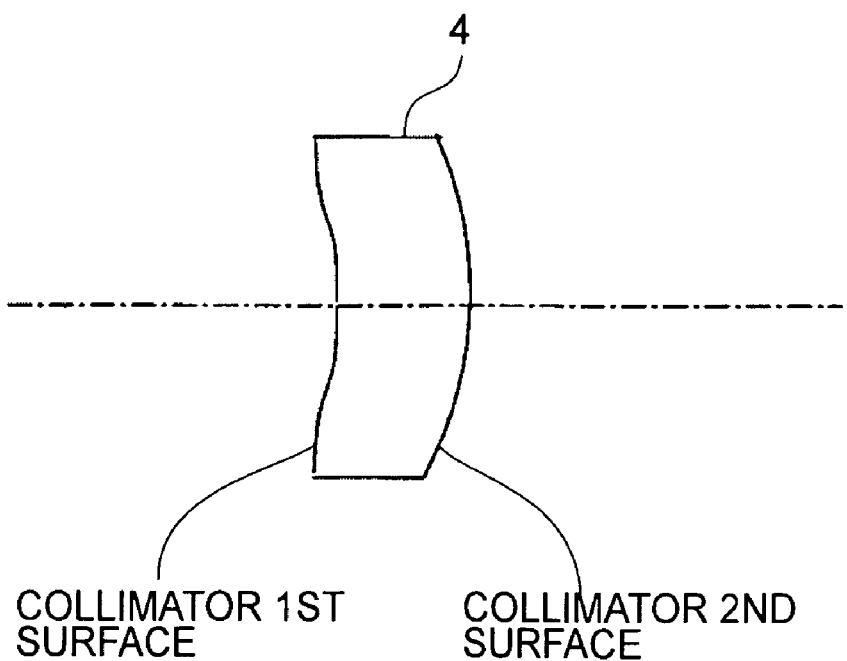
Figure 4:
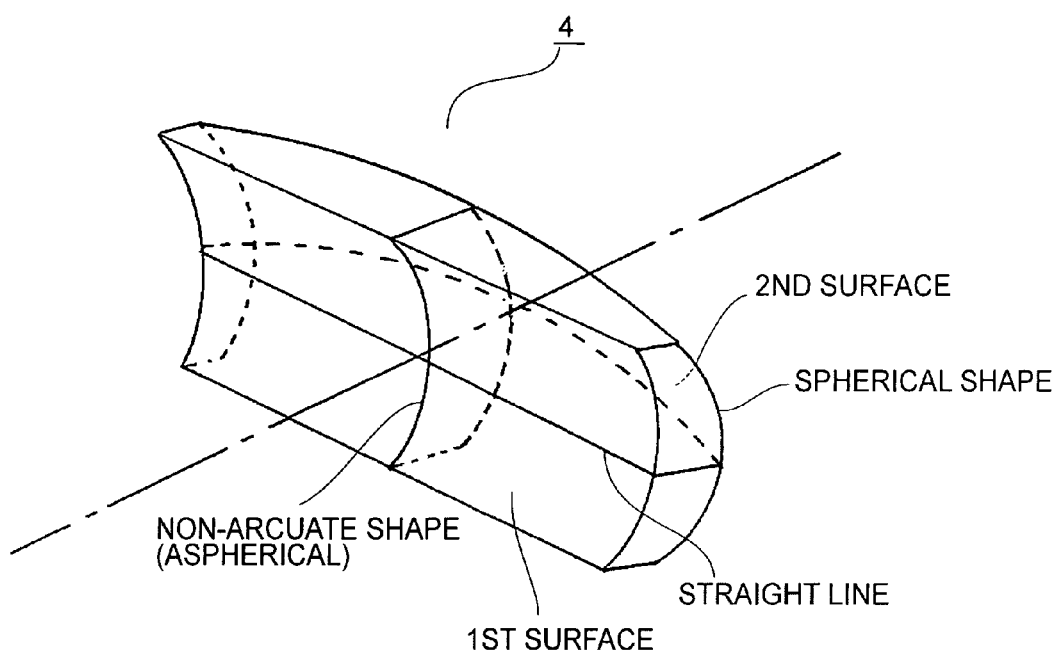
FIG. 4 is a perspective view of the light collecting lens in the first embodiment of the present invention.

FIGS. 3A and 3B illustrate sectional views of the collecting lens (collimator lens) 4 of this embodiment, along the main-scan sectional plane and the sub-scan sectional plane, respectively. FIG. 4 illustrates a perspective view of the collecting lens 4.

Figure 5A:
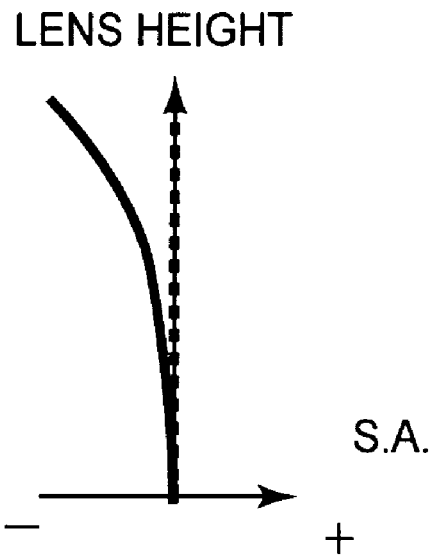
FIGS. 5A though 5D illustrate spherical aberration produced by an input optical system according to the first embodiment of the present invention.
Figure 5B:
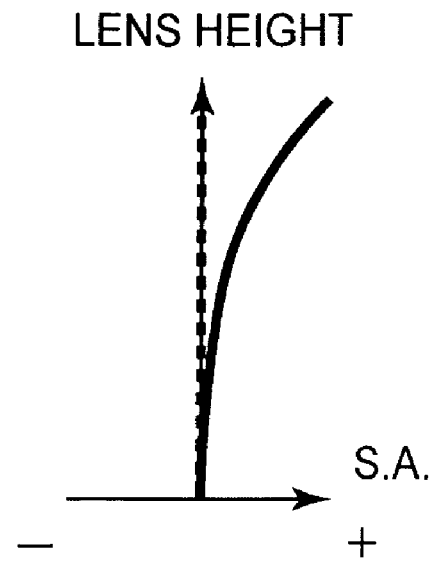

FIG. 5A illustrates spherical aberration (S.A) of the cylindrical lens 2, and FIG. 5B illustrates spherical aberration as produced by the first surface of the collecting lens 4. It is seen from FIGS. 5A and 5B that, in the sub-scan sectional plane, the first surface of the collecting lens 4 produces "over" (positive) wavefront aberration by which "under" (negative) spherical aberration produced by the cylindrical lens 2 is compensated (reduced). With this arrangement, enlargement of the light spot on the scan surface 9 is avoided or reduced, by which high-quality image formation is assured.

Figure 5C:
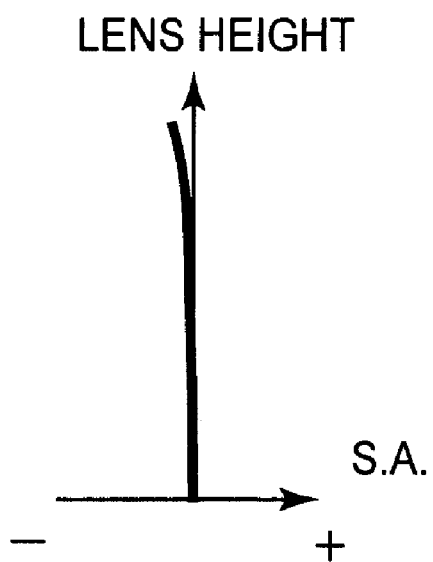

The second surface (light exit surface) of the collecting lens 4 is defined by a spherical shape as described above. FIG. 5C illustrates spherical aberration being produced at the second surface of the collecting lens 4. It is seen from FIG. 5C that, since the light-entrance side F number of the input optical system LA is as sufficiently large as 14, the spherical aberration produced at the second surface of the collecting lens 4 is as quite small as not contributing the light spot enlargement.

With the setting of the collecting lens 4 as described, in each of the main-scan sectional plane and the sub-scan sectional plane, the spherical aberration produced by the input optical system LA can be compensated independently of the other.

Figure 5D:
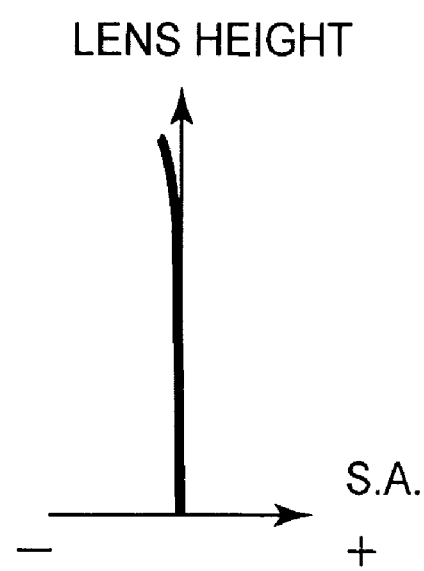

FIG. 5D illustrates spherical aberration produced by the input optical system LA. It is seen from FIG. 5D that the spherical aberration of the input optical system LA has been satisfactorily compensated to so small as not contributing enlargement of the light spot. The amount of spherical aberration remaining in the input optical system LA is substantially equal to the amount produced at the second surface of the collecting lens 4.

With regard to the input optical system LA, there is a tendency that the brighter the light-entrance side F number in the main-scan direction and the sub-scan direction is made, the larger the power of optical elements such as the collecting lens 4 and the cylindrical lens 2 is made. In this embodiment, the light-entrance side F number in the sub-scan direction is made quite bright as compared with that in the main-scan direction. In accordance with this relationship, in this embodiment, as compared with the focal length $f_{col}$ of the collecting lens in the sub-scan sectional plane which is being $f_{col}=71.12$ (mm), the focal length $f_{cyl}$ of the cylindrical lens 2 in the sub-scan sectional plane is made as quite short as $f_{cyl}=9.17$ (mm). Hence, the ratio of $|f_{col}|/|f_{cyl}|$ is made as large as 7.8×. In other words, the power of the cylindrical lens in the sub-scan sectional plane is made quite large as compared with the power of the collecting lens 4 in the sub-scan sectional plane.

Since the power of the cylindrical lens 2 is made very large as described, if the cylindrical lens 2 is made from a plastic lens, there is a possibility that a temperature rise will cause a large amount focus error on the scan surface 9.

On the other hand, since the power of the collecting lens is small, even if it is made from a plastic lens, the amount of focus error on the scan surface due to the temperature rise will be small and the influence to the light spot will be negligible.

In this embodiment, for the reasons described above, the cylindrical lens 2 is made from a glass lens while the collecting lens 4 is made from a plastic lens. With this arrangement, the focus error amount on the scan surface 9 due to a temperature rise is reduced to as small as not affecting the formation of light spot, and hence deterioration of image formation due to the temperature rise is avoided.

Furthermore, as described above, the cylindrical lens made of a glass material is defined only by a flat surface and an arcuate shaped surface, whereas the collecting lens made of a plastic material is defined by non-arcuate shaped surfaces. With this arrangement, as compared with a case wherein the cylindrical lens 2 is made from a glass lens having non-arcuate shaped surfaces, the input optical system LA can be produced more easily and conveniently.

In this embodiment, the ratio of $|f_{col}|/|f_{cyl}|$ between the focal length $f_{col}$, in the sub-scan sectional plane, of the collecting lens 4 which is made from a plastic lens and the focal length $f_{cyl}$, in the sub-scan sectional plane, of the cylindrical lens 2 which is made from a glass lens, is 7.8× as described hereinbefore. However, the advantageous results of the present invention will be attainable provided that the following condition is satisfied.

$$|f_{col}|/|f_{cyl}| \geqq 5$$

where $f_{col}$ is the focal length of the collecting lens 4 in the sub-scan sectional plane, and $f_{cyl}$ is the focal length, in the sub-scan sectional plane, of a lens having a power in the sub-scan direction.

Namely, by setting the $|f_{col}|/|f_{cyl}|$ ratio not less than 5× as above, the light quantity distribution on the scan surface which is peculiar to an OFS system can be well suppressed and, additionally, the advantageous effect of reduction of focus error due to the temperature rise is attainable satisfactorily.

In this embodiment, with regard to the focal lengths of the cylindrical lens 2 and the collecting lens 4, with respect to the main-scan sectional plane these focal lengths are infinite (mm) and 71.12 mm, respectively. With respect to the sub-scan sectional plane, their focal lengths are 9.17 mm and 71.12 mm, respectively. Namely, in the cylindrical lens 2, the power in the sub-scan sectional plane is larger than that in the main-scan sectional plane. On the other hand, the collecting lens 4 has the same or substantially equivalent power with respect to the main-scan sectional plane and the sub-scan sectional plane. Here, as regards the power in the main-scan sectional plane and the power in the sub-scan sectional plane, one of the scan sectional planes having a larger power is more influential to the spherical aberration and focus change. In consideration of this, in this embodiment, when the focal length of the cylindrical lens 2 in the sub-scan sectional plane is denoted by $f_{col}$ and the focal length of the collecting lens 4 in the sub-scan sectional plane is denoted by $f_{cyl}$ (regarding the collecting lens, it is the same as the focal length in the main-scan sectional plane), the condition $|f_{col}|/|f_{cyl}| \geqq 5$ is set and satisfied, by which advantageous results of the present invention are accomplished.

In summary, the advantageous results of the present invention are satisfactorily obtainable by comparing, in each lens, the power thereof in the main-scan sectional plane with the power thereof in the sub-scan sectional plane and, while taking the focal length of the lens in such scan sectional plane having a larger power as "$f_{col}$" or "$f_{cyl}$", by setting the power ratio to satisfy the condition $|f_{col}|/|f_{cyl}| \geqq 5$.

Embodiment 2

Figure 6A:
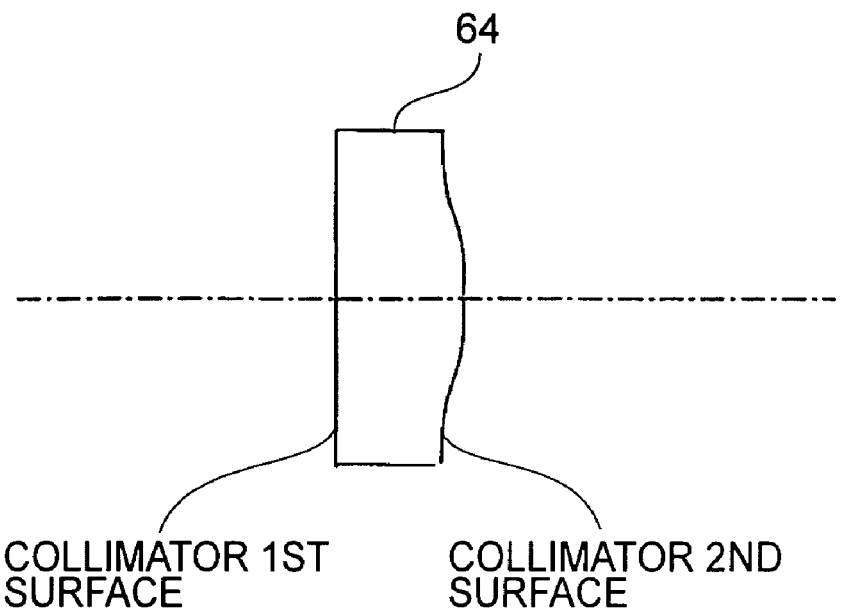
FIGS. 6A and 6B are sectional views, along the main-scan sectional plane and the sub-scan sectional plane, respectively, of a light collecting lens used in the second embodiment of the present invention.
Figure 6B:
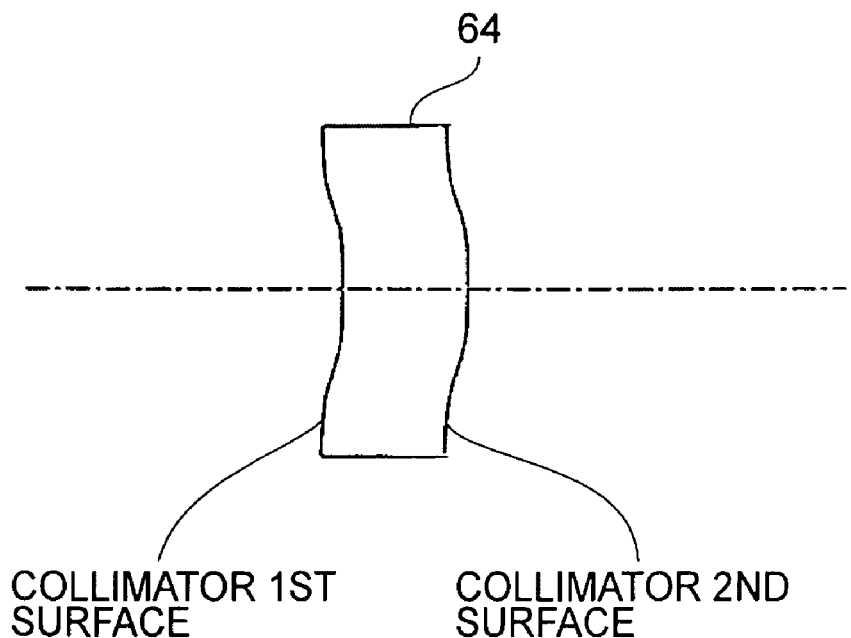

FIGS. 6A and 6B illustrate sectional views, along the main-scan sectional plane and the sub-scan sectional plane, respectively, of a collecting lens or collimator lens 64 according to a second embodiment of the present invention.

This embodiment differs from the first embodiment in that the second surface (light exit surface) of the collecting lens 64 has a different shape. The structures and optical functions of the remaining portion of this embodiment are essentially the same as those of the first embodiment, and hence similar advangeous results are obtainable with this embodiment.

More specifically, in the first embodiment, the second surface of the collecting lens is defined by a spherical shape. In this embodiment, as compared therewith, the second surface is defined by a non-arcuate shape being rotationally symmetric, both in the main-scan sectional plane and in the sub-scan sectional plane. This is to completely compensate the spherical aberration produced by the input optical system LA.

Hence, in this embodiment, the spherical aberration produced by the second surface itself of the collecting lens 64 is compensated, and a better light spot is produced on the scan surface.

It should be noted here that the second surface of the collecting lens may be defined by a non-arcuate shape being rotationally symmetrical, with respect to at least one of the main-scan sectional plane and the sub-scan sectional plane.

Figure 7A:
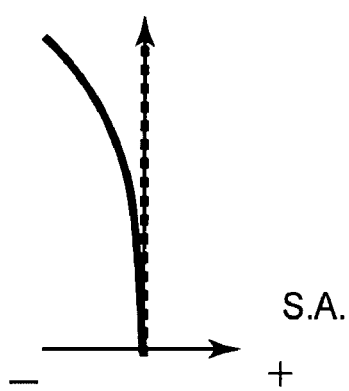
FIGS. 7A though 7D illustrate spherical aberration produced by an input optical system according to the second embodiment of the present invention.
Figure 7B:
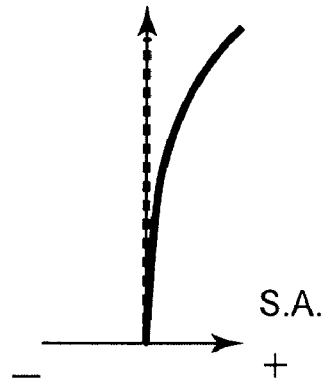

FIG. 7A illustrates spherical aberration (S.A) produced by the cylindrical lens 2, and FIG. 7B illustrates spherical aberration produced at the first surface of the collecting lens 64.

Figure 7C:
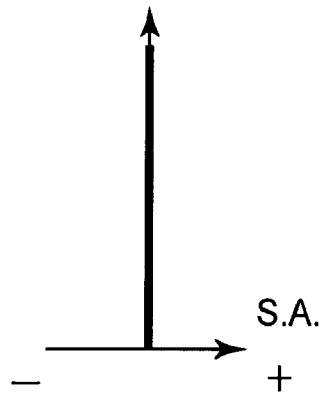
Figure 7D:
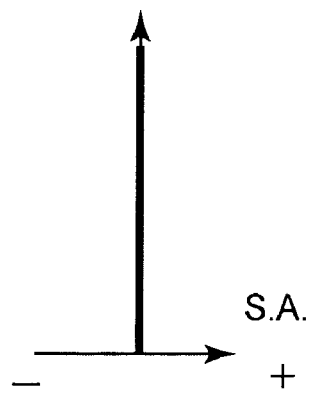

FIG. 7C illustrates spherical aberration produced at the second surface of the collecting lens 64 of this embodiment, and FIG. 7D illustrates spherical aberration produced by the input optical system LA. It is seen from FIG. 7C that almost no spherical aberration is produced at the second surface of the collecting lens 64. Hence, as best seen from FIG. 7D, the spherical aberration produced by the input optical system LA is well compensated, and therefore a better light spot is obtainable.

Embodiment 3

Figure 8A:
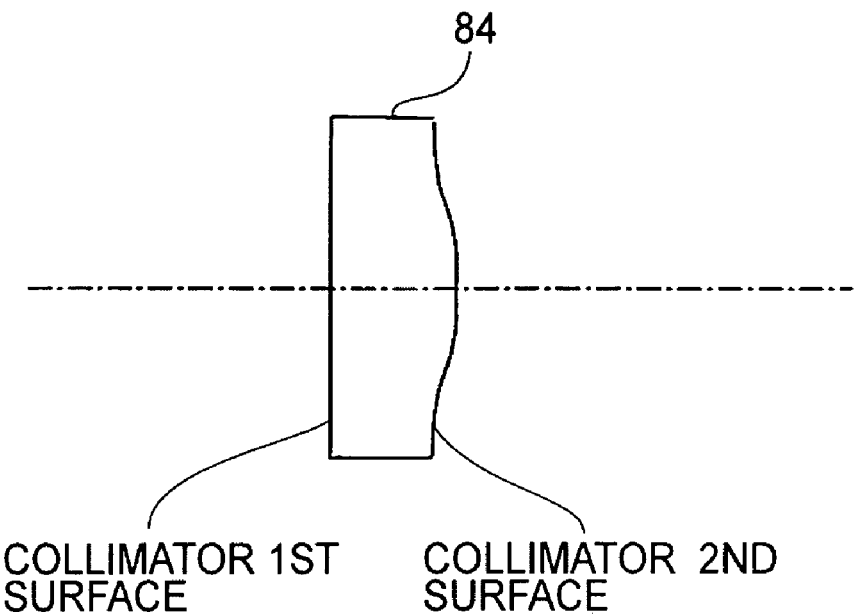
FIGS. 8A and 8B are sectional views, along the main-scan sectional plane and the sub-scan sectional plane, respectively, of a light collecting lens used in the third embodiment of the present invention.
Figure 8B:
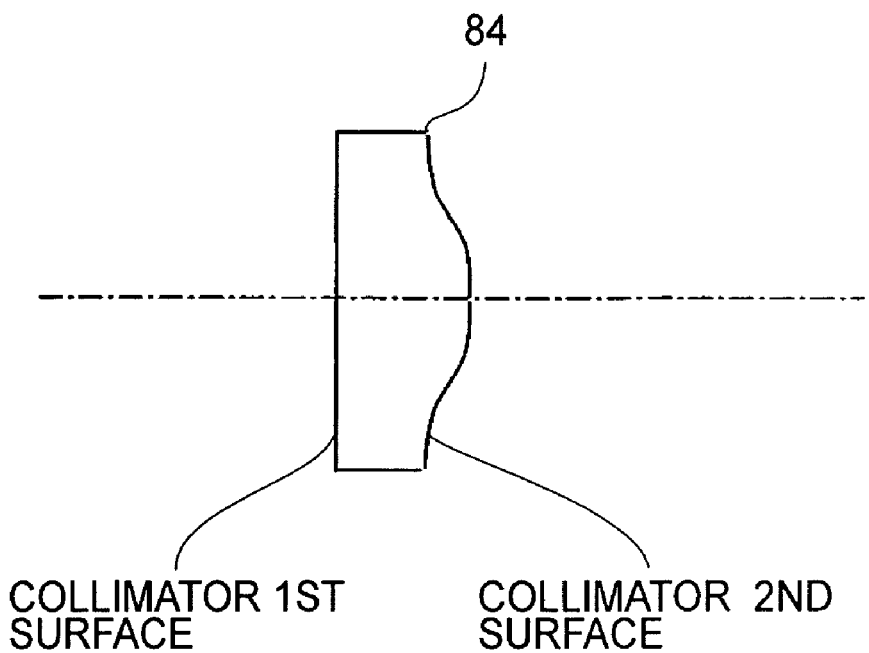

FIGS. 8A and 8B illustrate sectional views, along the main-scan sectional plane and the sub-scan sectional plane, respectively, of a collecting lens or collimator lens 84 according to a third embodiment of the present invention.

This embodiment differs from the first embodiment in that the first and second surfaces of the collecting lens 64 have different shapes. The structures and optical functions of the remaining portion of this embodiment are essentially the same as those of the first embodiment, and hence similar advantageous results are obtainable with this embodiment.

More specifically, in this embodiment, the first surface of the collecting lens 84 is defined by a flat surface shape in the main-scan direction and the sub-scan direction, while the second surface thereof is defined by a rotationally asymmetrical shape and yet, in the main-scan sectional plane and the sub-scan sectional plane, a non-arcuate shape. Here, it should be noted that the first surface may be defined by a curved surface having a rotationally symmetrical shape.

With the arrangement of this embodiment described above, with respect to the sub-scan sectional plane, the second surface produces aberration which effectively cancels the spherical aberration produced by the second cylindrical lens 2. With respect to the main-scan direction, the second surface itself of the collecting lens 84 compensates the spherical aberration to be produced.

Figure 9A:
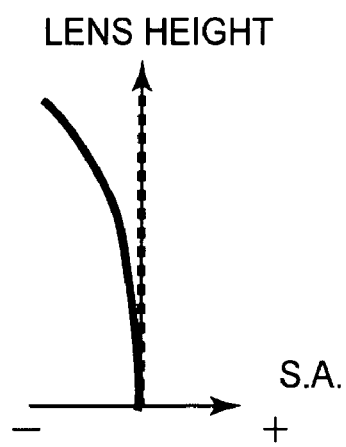
FIGS. 9A though 9D illustrate spherical aberration produced by an input optical system according to the third embodiment of the present invention.
Figure 9B:
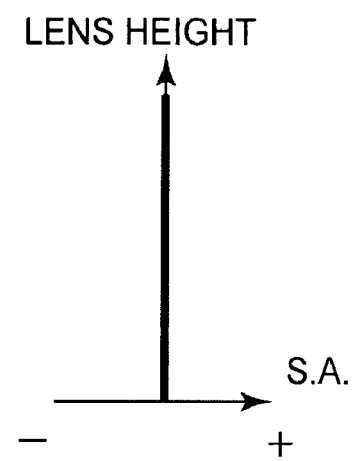
Figure 9C:
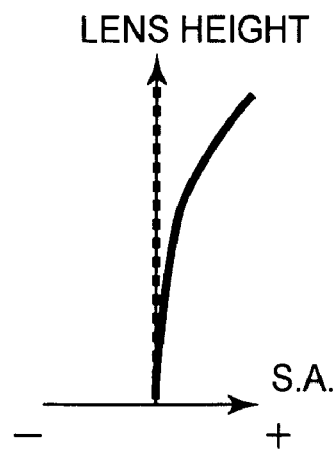
Figure 9D:
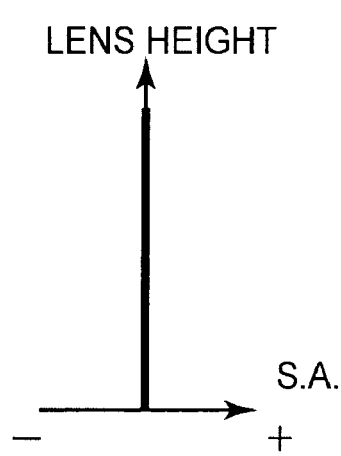

FIGS. 9A thorough 9D illustrate spherical aberrations produced by the input optical system and by the lenses constituting the same, in this embodiment. Among them, FIG. 9A illustrates spherical aberration produced by the cylindrical lens 2, and FIG. 9B illustrates spherical aberration produced at the first surface of the collecting lens 84. FIG. 9C illustrates spherical aberration produced at the second surface of the collecting lens 84, and FIG. 9D illustrates spherical aberration produced by the input optical system LA.

It is seen from FIGS. 9B and 9C that the collecting lens 84 functions to produce only such spherical aberration of opposite direction which is effective to cancel or reduce the spherical aberration produced by the cylindrical lens 2. As a result, as best seen from FIG. 9D, the spherical aberration produced by the input optical system LA is well compensated, and a good light spot is obtainable on the scan surface.

In the first to third embodiments of the present invention described above, the light-entrance side F number of the input optical system LA in the main-scan direction is made larger than that in the sub-scan direction, so as to reduce non-uniformness of the illuminance distribution upon the surface to be scanned. However, the present invention is not limited to this. Namely, the light-entrance side F number in the main-scan direction may be made smaller than that in the sub-scan direction, with advantageous results of the present invention, provided that the light-entrance side F number in the sub-scan section is small, that is, $F_{no} \leq 4$.

Furthermore, in the first to third embodiments of the present invention described above, the light-entrance side F number of the input optical system LA in the main-scan direction is 14 while that in the sub-scan direction is 4. Namely, the F number in the sub-scan direction is made brighter than that in the main-scan direction. In accordance with this relationship, the cylindrical lens and the collecting lens are disposed in this order from the light source means 1 side. However, the present invention is not limited to this. From the light source means 1 side, the collecting lens and the cylindrical lens may be disposed in this order.

Still further, in the first to third embodiments of the present invention described above, the input optical system LA comprises an OFS system. However, it may comprise an "under fild optical system" (UFS system). The advantageous results of the present invention are well attainable, provided that the light-entrance side F number of the input optical system LA in the sub-scan direction is small, that is, $F_{no} \leq 4$.

Yet further, in the first to third embodiments of the present invention described above, the light source means 1 comprises a monolithic multi-beam semiconductor laser. However, a single-beam semiconductor laser may be used in place of it.

Furthermore, in the first to third embodiments of the present invention described above, a single-path structure is employed in which the light beam before being deflected by the optical deflector 6 goes without passing through the imaging lens 8. However, the system may use a double-path structure in which the light beam before being deflected by the optical deflector 6 goes while passing through the imaging lens 8.

Furthermore, although in the first to third embodiments of the present invention described above the imaging optical system LB is provided by a single imaging lens 8, it may be provided by plural lenses. Still further, the imaging optical system LB may include a diffractive optical element.

Yet further, in the first to third embodiments of the present invention described above, the light beam emerging from the collecting lens is a slightly convergent light beam. This is to shorten the optical path length from the deflecting surface 7 of the optical deflector 6 to the scan surface 9. However, the light beam emerging from the collecting lens may be a parallel light beam or a slightly divergent light beam.

Table 1 below shows details of the structures according to the first to third embodiments of the present invention. Table 2 below shows parameters r, d and n of the input optical system in the first to third embodiments of the present invention.

TABLE 1

| Embodiments 1–3 | | | |
|---|---|---|---|
| Laser Power | E | 5 | (mW) |
| No. of Light Emission Points | N | 2 | |
| Interval of Light Emission Points | d1 | 90 | (μm) |
| Used Wavelength | λ | 790 | (nm) |
| Light-Entrance Side Main-Scan Direction F Number | Fm | 14 | — |
| Light-Entrance Side Sub-Scan Direction F Number | Fs | 4 | — |
| Cylindrical Lens Focal Length | fs | 9.17 | (mm) |
| Collecting Lens Focal Length | Fcol | 71.12 | (mm) |
| Entire Length of Input Optical System | Lo | 162.82 | (mm) |
| Polarizing Surface Width in Main-Scan Direction | W | 2.85 | (mm) |
| Effective Light-Flux Width in Main-Scan Direction | Wo | 5.02 | (mm) |
| Polygon Circumscribed Circle Diameter | φ1 | 84 | (mm) |
| Polygon Inscribed Circle Diameter | φ2 | 6.84 | (mm) |
| No. of Deflective Reflection Surfaces | M | 8 | (surfaces) |
| Scan Efficiency | Du | 90 | (%) |
| Maximum Scan Angle | +/− α | 40.5 | (deg) |
| Sub-Scan Magnification of Imaging Optical System | βs | 2 | (x) |
| Effective Scan Width | 2Yo | 214 | (mm) |
| Main-Scan Spot Diameter | ρm | 60 | (μm) |
| Sub-Scan Spot Diameter | ρs | 70 | (μm) |

TABLE 2

| Optical Element | Surface No. | d: Surface Spacing | n: Refractive Index |
|---|---|---|---|
| Laser | 1st | 6.30 | 1 |
| Cylindrical Lens | 2nd | 5.00 | 1.76203 |
| Cylindrical Lens | 3rd | 59.96 | 1 |
| Collecting Lens | 4th | 5.00 | 1.51072 |
| Collecting Lens | 5th | 69.1 | 1 |
| Deflecting Surface | 6th | — | — |

Table 3 below shows details of the aspherical shape according to the first embodiment. Table 4 below shows details of the aspherical shape according to the second embodiment. Table 5 below shows details of the aspherical shape according to the third embodiment.

TABLE 3

| Aspherical Surface Shape of Input Optical System in Embodiment 1 | | | | |
|---|---|---|---|---|
| Optical Element | | | Collecting Lens | |
| Surface | Cylindrical Lens | | 4th | |
| No. Surface Surface Shape | 2nd Surface Flat | 3rd Surface Anamorphic | Surface Non-Arcuate Anamorphic | 5th Surface Spherical |
| Meridional-Line Shape | R | Infinite | Infinite | Infinite | −36.32 |
| | K | 0 | 0 | 0 | 0 |
| | B4 | 0 | 0 | 0 | 0 |
| | B6 | 0 | 0 | 0 | 0 |
| | B8 | 0 | 0 | 0 | 0 |
| | B10 | 0 | 0 | 0 | 0 |
| Sagittal-Line Shape | R | Infinite | −6.99 | Infinite | — |
| | Ks | 0 | 0 | 0 | — |
| | D4 | 0 | 0 | −3.20e−4 | — |
| | D6 | 0 | 0 | −3.80e−5 | — |
| | D8 | 0 | 0 | −4.95e−6 | — |
| | D10 | 0 | 0 | −1.90e−6 | — |

TABLE 4

Aspherical Surface Shape of Input Optical System in Embodiment 2

| Optical Element Surface No. | Cylindrical Lens 2nd Surface Flat | Cylindrical Lens 3rd Surface Anamorphic | Collecting Lens 4th Surface Non-Arcuate Anamorphic | Collecting Lens 5th Surface Rotationally Symmetric Aspherical |
|---|---|---|---|---|
| Meridional-Line Shape | | | | |
| R | Infinite | Infinite | Infinite | −36.32 |
| K | 0 | 0 | 0 | −2.26 |
| B4 | 0 | 0 | 0 | 1.60e−7 |
| B6 | 0 | 0 | 0 | 0 |
| B8 | 0 | 0 | 0 | 0 |
| B10 | 0 | 0 | 0 | 0 |
| Sagittal-Line Shape | | | | |
| R | Infinite | −6.99 | Infinite | — |
| Ks | 0 | 0 | 0 | — |
| D4 | 0 | 0 | −3.20e−4 | — |
| D6 | 0 | 0 | −3.80e−5 | — |
| D8 | 0 | 0 | −4.95e−6 | — |
| D10 | 0 | 0 | −1.90e−6 | — |

TABLE 5

Aspherical Surface Shape of Input Optical System in Embodiment 3

| Optical Element Surface No. | Cylindrical Lens 2nd Surface Flat | Cylindrical Lens 3rd Surface Anamorphic | Collecting Lens 4th Surface Flat | Collecting Lens 5th Surface Non-Arcuate Anamornhic |
|---|---|---|---|---|
| Meridional-Line Shape | | | | |
| R | Infinite | Infinite | Infinite | −36.32 |
| K | 0 | 0 | 0 | −2.26 |
| B4 | 0 | 0 | 0 | 1.60e−7 |
| B6 | 0 | 0 | 0 | 0 |
| B8 | 0 | 0 | 0 | 0 |
| B10 | 0 | 0 | 0 | 0 |
| Sagittal-Line Shape | | | | |
| R | Infinite | −6.99 | Infinite | −36.32 |
| Ks | 0 | 0 | 0 | 2.40 |
| D4 | 0 | 0 | 0 | 3.30e−4 |
| D6 | 0 | 0 | 0 | 3.50e−5 |
| D8 | 0 | 0 | 0 | 6.00e−6 |
| D10 | 0 | 0 | 0 | 2.50e−6 |

The surface shape of the spherical surface and the rotationally symmetric non-arcuate surface can be expressed in terms of equations (1) and (2) below.

Namely, when the point of intersection between the lens curved surface and the optical axis is taken as an origin, the optical axis direction is taken as X axis, an axis orthogonal to the optical axis in the main-scan plane is taken as Y axis, and an axis orthogonal to the optical axis in the sub-scan plane is taken as Z axis, there are relations:

$$X = \frac{h^2/R}{1+\sqrt{(1-(1+K)\times(h/R)^2}} + B_4 h^4 + + B_6 h^6 + B_8 h^8 + B_{10} h^{10} \quad (1)$$

$$h = \sqrt{Y^2 + Z^2} \quad (2)$$

wherein R is the curvature radius, K is the eccentricity, and $B_4$, $B_6$, $B_8$ and $B_{10}$ are aspherical coefficients.

On the other hand, the surface shape of the anamorphic surface and non-arcuate anamorphic surface can be expressed in terms of the following equation.

More specifically, when the point of intersection between the lens curved surface and the optical axis is taken as an origin, the optical axis direction is taken as X axis, an axis orthogonal to the optical axis in the main-scan plane is taken as Y axis, and an axis orthogonal to the optical axis in the sub-scan plane is taken as Z axis, and where a cutting-plane line between the X-Y plane and the curved surface is taken as a meridional line and a cutting-plane line between the X-Y plane and the curved surface in a direction orthogonal to the meridional line is taken as a sagittal line, the shape of the meridional line can be expressed by an equation (3) below.

$$X = \frac{Y^2/R}{1+\sqrt{(1-(1+K)\times(Y/R)^2}} + B_4 Y^4 + + B_6 Y^6 + B_8 Y^8 + B_{10} Y^{10} \quad (3)$$

wherein R is the curvature radius in the meridional-line direction, K is the curvature radius in the meridional-line direction, and $B_4$, $B_6$, $B_8$ and $B_{10}$ are aspherical coefficients of the meridional line.

The shape of the sagittal line can be expressed by an equation (4) below.

$$S = \frac{Z^2/r}{1+\sqrt{(1-(1+Ks)\times(Z/r)^2}} + D_4 Z^4 + + D_6 Z^6 + D_8 Z^8 + D_{10} Z^{10} \quad (4)$$

wherein r is the curvature radius in the sagittal-line direction, K is the curvature radius in the sagittal-line direction, and $D_4$, $D_6$, $D_8$ and $D_{10}$ are aspherical coefficients of the sagittal line.

In the first and second embodiments of the present invention, a non-arcuate anamorphic surface is formed at the light entrance surface of the collecting lens. In this non-arcuate anamorphic surface with respect to the sub-scan sectional plane, the aspherical coefficient is added thereto so that the more the surface is off the optical axis, the closer it nears to the light source side than to its base flat surface.

In the first and second embodiments, the non-arcuate anamorphic surface shape is determined in this manner, by which wavefront aberration effectively cancelling the aspherical aberration is produced and, as a result, the spherical aberration produced by the cylindrical lens is well corrected.

In the third embodiment of the present invention, on the other hand, a non-arcuate anamorphic surface is formed at the light exit surface of the collecting lens. In this non-arcuate anamorphic surface with respect to the sub-scan sectional plane, the aspherical coefficient is added thereto so that the more the surface is off the optical axis, the closer it nears to the optical deflector side than to its base arcuate surface (r=−36.32).

In the third embodiment, the non-arcuate anamorphic surface shape is determined in this manner, by which wavefront aberration effectively cancelling the aspherical aberration is produced and, as a result, the spherical aberration produced by the cylindrical lens is well corrected.

Here, it should be noted that at least one surface of the collecting lens may be defined by a surface in which, not in the sub-scan sectional plane only, but rather in both of the main-scan sectional plane and the sub-scan sectional plane, different spherical coefficients are added to the respective curvature radii.

In the first to third embodiments of the present invention, the non-arcuate shape of the non-arcuate anamorphic surface of the collecting lens in the sub-scan sectional plane may be set so as to satisfy the conditions below, by which the spherical aberration produced by the cylindrical lens can be corrected.

Namely, when the point of intersection between the lens curved surface and the optical axis is taken as an origin, the optical axis direction is taken as X axis, an axis orthogonal to the optical axis in the main-scan plane is taken as Y axis, and an axis orthogonal to the optical axis in the sub-scan plane is taken as Z axis, there are relations:

$$Ui \times A < 0 \quad (5)$$

$$A = (S_1 - S_1') \quad (6)$$

where

Ui is a function that takes Ui=1 when concerned with a light-entrance side of the lens and that takes Ui=−1 when concerned with a light-exit side of the lens;

A is an amount of sag, in the sub-scan sectional plane, of the non-arcuate anamorphic surface from an arcuate surface, with respect to a Z coordinate through which a marginal light ray passes;

$S_1$ is an X coordinate, in the sub-scan sectional plane, at the point of intersection between the marginal light ray and the non-arcuate anamorphic surface; and $S_1'$ is an X coordinate, in the sub-scan sectional plane, at the point of intersection between the marginal light ray and an arcuate surface upon which the non-arcuate anamorphic surface, with respect to the Z coordinate, at the point of intersection between the marginal light ray and the non-arcuate anamorphic surface is based.

The amount A corresponds to the sag amount, in the sub-scan sectional plane and with respect to the Z coordinate through which the marginal light ray passes, between the non-arcuate anamorphic surface and the arcuate surface on which the non-arcuate surface is based.

If condition (5) is satisfied, where the non-arcuate anamorphic surface is at the light entrance surface of the lens, this non-arcuate anamorphic surface has such shape with respect to the sub-scan sectional plane that the more it is off the optical axis, the closer it nears to the light source side than to its base arcuate surface. On the other hand, where the non-arcuate anamorphic surface is at the light exit surface of the lens, this non-arcuate anamorphic surface has such shape with respect to the sub-scan sectional plane that the more it is off the optical axis, the closer it nears to the deflector side than to its base arcuate surface.

As the light beam passes through the non-actuate surface having such shape as described above, wavefront aberration effectively canceling the spherical aberration is produced. Hence, with respect to the sub-scan sectional plane, by providing the collecting lens with a non-arcuate surface of such surface shape, the spherical aberration produced by the cylindrical lens can be corrected.

In the first embodiment of the present invention, since the non-arcuate anamorphic surface is provided at the light-entrance surface of the collecting lens, Ui=1 and the light beam diameter on the non-arcuate anamorphic surface in the sub-scan sectional plane is 2.29 mm. Here, when the point of intersection between the lens curved surface and the optical axis is taken as an origin, the optical axis direction is taken as X axis, an axis orthogonal to the optical axis in the main-scan plane is taken as Y axis, and an axis orthogonal to the optical axis in the sub-scan plane is taken as Z axis, the Z coordinate of the point of intersection between the marginal light ray and the non-arcuate anamorphic surface is 1.15 mm, while the X coordinate of the same is $-6.63 \times 10^{-4}$ mm. Namely, $S_1 = -6.63 \times 10^{-4}$ mm.

On the other hand, the X coordinate of the arcuate surface on which the non-arcuate anamorphic surface is based, corresponding to the Z coordinate 1.15 mm, is 0 mm, namely, $S_1 = 0$ mm (since the curvature radius $r = \infty$, the arcuate surface is actually flat).

Hence, in the first embodiment, there is a relation $Ui \times A = -6.63 \times 10^{-4} < 0$. Thus, condition (5) is satisfied.

In the first embodiment, the non-arcuate anamorphic surface of the collecting lens is determined in the manner described above, by which the spherical aberration produced by the cylindrical lens is corrected.

In the second embodiment, on the other hand, since specifications other than the shape of the light exit surface of the collecting lens are the same, there are relations Ui=1, $S_1 = -6.63 \times 10^{-4}$ mm, and $Ui \times A = -6.63 \times 10^{-4} < 0$. Hence, condition (5) is satisfied.

In the first and second embodiments, with respect to the sub-scan sectional plane the non-arcuate anamorphic surface shape is determined in the manner described above, by which the spherical aberration produced by the cylindrical lens is corrected.

In the third embodiment, since the non-arcuate anamorphic surface is defined at the light-entrance surface of the collecting lens, Ui=1. The light beam diameter on the non-arcuate anamorphic surface, in the sub-scan sectional plane, is 2.29 mm.

Here, the Z coordinate of the point of intersection between the marginal light ray and the non-arcuate anamorphic surface is 1.15 mm. The X coordinate of the same is $-1.75 \times 10^{-2}$ mm. That is, $S_1 = -1.75 \times 10^{-2}$ mm.

Furthermore, the X coordinate of the arcuate surface on which the non-arcuate anamorphic surface is based (that is, an arcuate surface having a curvature radius $r = -36.32$ mm), corresponding to the Z coordinate of 1.15 mm, is equal to $-1.81 \times 10^{-2}$ mm. Namely, $S_1' = -1.81 \times 10^{-2}$ mm.

Hence, in the third embodiment there is a relation $Ui \times A = -6.79 \times 10^{-4} < 0$. Thus, condition (5) is satisfied. Particularly, in the third embodiment, the surface shape is determined to include, in addition to the amount of sag (i.e., $Ui \times A = -6.63 \times 10^{-4}$) of the non-arcuate anamorphic surface from the arcuate surface necessary for correcting the spherical aberration produced by the cylindrical lens, the amount of sag (i.e., $Ui \times A = -0.16 \times 10^{-4}$) necessary for correcting the spherical aberration produced by the collecting lens itself.

In the third embodiment, with respect to the sub-scan sectional plane the non-arcuate anamorphic surface shape is determined in the manner described above, by which the spherical aberration produced by the cylindrical lens is corrected and, additionally, aberration correction is made to avoid production of spherical aberration by the collecting lens itself.

In the first and second embodiments of the present invention, with respect to the sub-scan sectional plane, the aspherical coefficients in the fourth-order to tenth-order terms of the non-arcuate anamorphic surface of the collecting lens are all set at positive values or, alternatively, all at negative values. However, all the values of the fourth-order to tenth-order term aspherical coefficients may not necessarily be positive or negative. If the aspherical coefficients are determined to satisfy condition (5), the spherical aberration at the light beam edge position where the spherical aberration is largest can be corrected. Therefore, substantially the same the advantageous results of the present invention will be attainable.

In accordance with the first to third embodiments of the present invention, a non-arcuate anamorphic surface is formed on the collecting lens to thereby correct spherical aberration produced by the cylindrical lens or spherical aberration to be produced by the collecting lens itself. However, the aspherical shape of the non-arcuate anamorphic surface may be designed so as to correct spherical aberration as well to be produced by any other optical elements.

For example, if the input optical system includes any optical elements other than the cylindrical lens and the collecting lens, the aspherical surface shape of the non-arcuate anamorphic surface may be designed so as to correct spherical aberration as well to be produced by these optical elements. The advantageous effects of the present invention are well attainable in that occasion. With regard to spherical aberration to be produced by the scanning optical system as well, the aspherical surface shape of the non-arcuate anamorphic surface may be designed similarly. In that occasion, spherical aberration produced in the whole system can be well corrected, and better light spots will be obtainable.

Embodiment of Image Forming Apparatus

Figure 10:
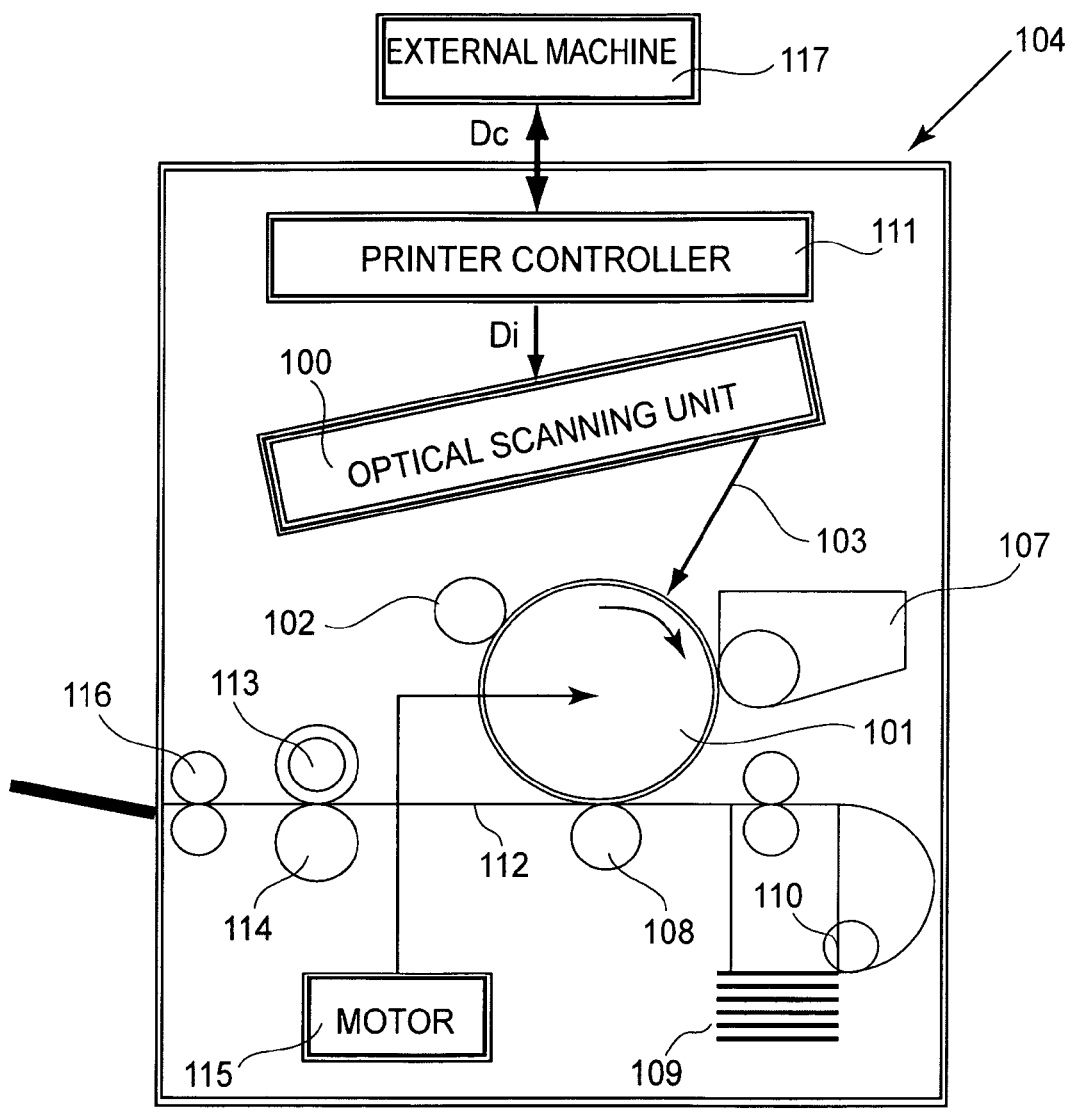
FIG. 10 is a sectional view, along the sub-scan sectional plane, of an image forming apparatus according to an embodiment of the present invention.

FIG. 10 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 10) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 15) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 10, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

Embodiment of Color Image Forming Apparatus

Figure 11:
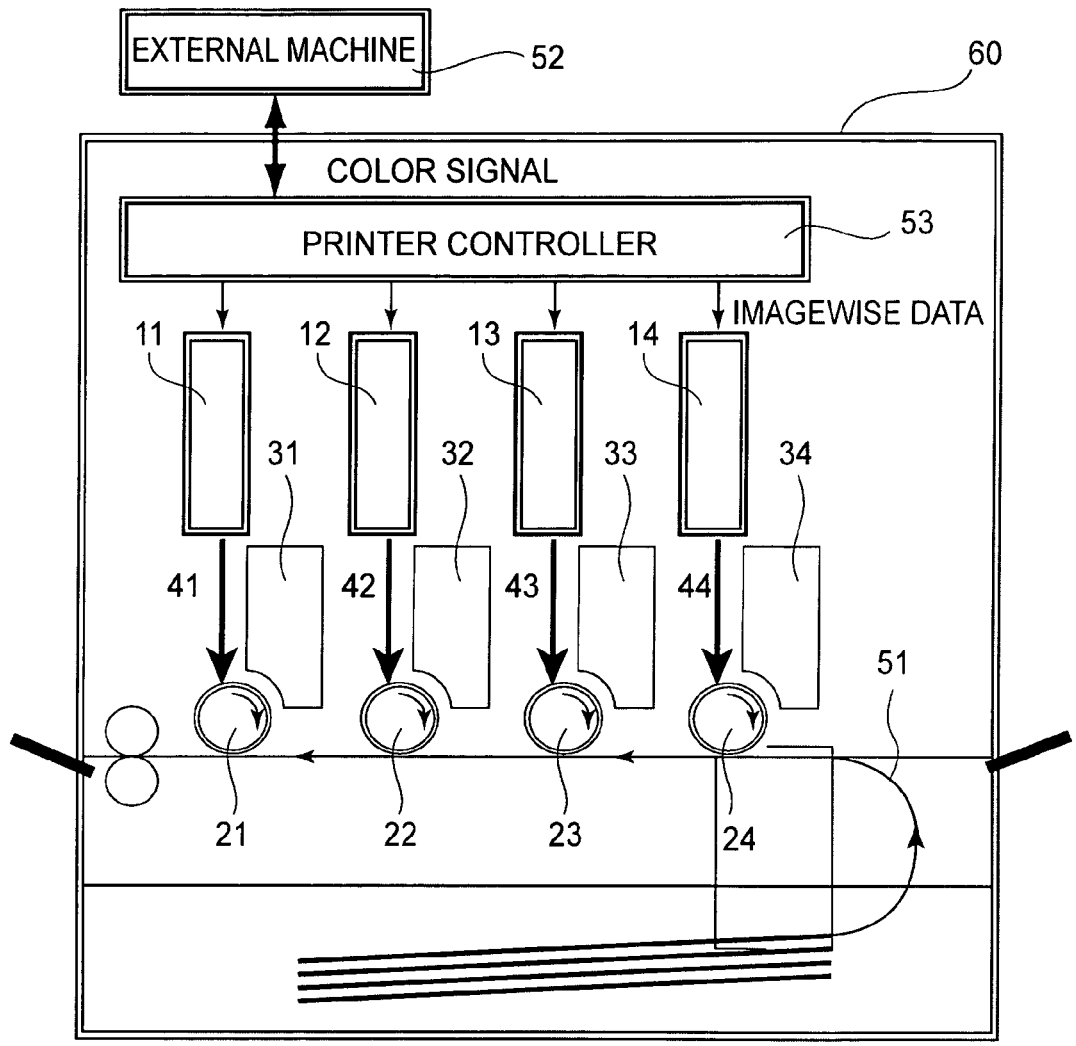
FIG. 11 is a schematic view of a main portion of a color image forming apparatus according to an embodiment of the present invention.

FIG. 11 is a schematic view of a main portion of a color image forming apparatus according to an embodiment of the present invention. This embodiment is directed to a tandem type color image forming apparatus in which four optical scanning systems are provided so as to record imagewise data upon the surfaces of corresponding photosensitive drums (image bearing members) in parallel to each other.

In FIG. 11, denoted generally at 60 is a color image forming apparatus, and denoted at 11, 12, 13 and 14 are optical scanning systems having a structure according to any one of the preceding embodiments. Denoted at 21, 22, 23 and 24 are photosensitive drums (image bearing members), and denoted at 31, 32, 33 and 34 are developing devices, respectively. Denoted at 51 is a conveyance belt.

In FIG. 11, the cooler image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and K (black).

These imagewise data are inputted into the optical scanning systems 11, 12, 13 and 14, respectively. In response, these optical scanning systems produce light beams 41, 42, 43 and 44 having been modulated in accordance with the associated imagewise data. Through these light beams, the photosensitive surfaces of the photosensitive drums 21, 22, 23 and 24 are scanned in the main-scan direction.

In the cooler image forming apparatus of this embodiment, four optical scanning systems 11, 12, 13 and 14 are provided and these correspond to colors of C (cyan), M (magenta), Y (yellow) and K (black), respectively. These scanning systems are operable in parallel to each other to record imagewise signals upon the surfaces of the photosensitive drums 21, 22, 23 and 24, respectively, so that a color image can be printed at high speed.

As described, the color image forming apparatus of this embodiment uses four optical scanning systems 11, 12, 13 and 14 to produce latent images for different colors upon the surfaces of corresponding photosensitive drums 21, 22, 23 and 24, respectively, by use of light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 305795/2005 filed Oct. 20, 2005, for which is hereby incorporated by reference.

What is claimed is:

1. An optical scanning system, comprising:
light source means;
deflecting means;
an input optical system for directing a light beam from said light source means to said deflecting means; and
an imaging optical system for directing the light beam deflected by said deflecting means onto a surface to be scanned;
wherein the light beam incident on a deflecting surface of said deflecting means has a width larger than that of said deflecting surface with respect to a main-scan direction,
wherein a light-entrance side F number of said input optical system in the main-scan direction is larger than a light-entrance side F number of said input optical system in a sub-scan direction,
wherein said input optical system includes a first optical element having a power both in a main-scan sectional plane and in a sub-scan sectional plane, and a second optical element having a power in the sub-scan sectional plane,
wherein said first optical element is made of a plastic material, while said second optical element is made of a glass material,
wherein, in an order from said light source means, said second optical element and said first optical element are disposed in sequence, and the power of said second optical element in the sub-scan sectional plane is larger than the power of said first optical element in the sub-scan sectional plane, and
wherein at least one surface of said first optical element has a non-arcuate shape in the sub-scan sectional plane so as to reduce spherical aberration to be produced at said second optical element.

2. An optical scanning system according to claim 1, wherein, when the light-entrance side F number of said input optical system is denoted by $F_{no}$, a relation $F_{no} \leq 4$ is satisfied.

3. An optical scanning system according to claim 1, wherein, when said first optical element has a focal length in the sub-scan sectional plane as denoted by $f_{col}$ and said second optical element has a focal length in the sub-scan sectional plane as denoted by $f_{cyl}$, the following relation is satisfied:

$$|f_{col}/f_{cyl}| \geq 5.$$

4. An optical scanning system according to claim 1, wherein, when a point of intersection between a curved surface of said first optical element and an optical axis of said input optical system is taken as an origin, a direction of the optical axis of said input optical system is taken as X axis, an axis orthogonal to the optical axis of said input optical system in the main-scan sectional plane is taken as Y axis, and an axis orthogonal to the optical axis of said input optical system in the sub-scan sectional plane is taken as Z axis, said first optical element has a lens surface shape tat satisfies the following relations:

$$Ui \times A < 0$$

$$A = (S_1 - S_1')$$

where
Ui is a function that takes Ui=1 when concerned with a light entrance side of said first optical element and that takes Ui=−1 when concerned with a light exit side of said first optical element;
A is an amount of sag, in the sub-scan sectional plane, of a non-arcuate anamorphic surface from an arcuate surface with respect to a Z coordinate through which a marginal light ray of the light beam passes;
$S_1$ is an X coordinate, in the sub-scan sectional plane, at the point of intersection between the marginal light ray of the light beam and the non-arcuate anamorphic surface; and
$S_1'$ is an X coordinate, in the sub-scan sectional plane, at the point of intersection between the marginal light ray and an arcuate surface upon which the non-arcuate anamorphic surface, with respect to the Z coordinate, at the point of intersection between the marginal light ray of the light beam and the non-arcuate anamorphic surface is based.

5. An image forming apparatus, comprising:
an optical scanning system as recited in claim 1;
a photosensitive material disposed at a scan surface to be scanned;
a developing device for developing an electrostatic latent image formed on said photosensitive material through a light beam scanned by said optical scanning system, to produce a toner image;

a transferring device for transferring the developed toner image onto a transfer material; and a fixing device for fixing the transferred toner image, on the transfer material.

6. An image forming apparatus, comprising:

an optical scanning system as recited in claim 1; and a printer controller for converting code data supplied from an outside machine into an imagewise signal and for inputting the imagewise signal into said optical scanning system.

7. A color image forming apparatus, comprising:

an optical scanning system as recited in claim 1; and a plurality of image bearing members each being disposed at a scan surface to be scanned by said optical scanning system, for fanning images of different colors.

8. A color image forming apparatus according to claim 7, further comprising a printer controller for converting a color signal supplied from an outside machine into imagewise data of different colors and for inputting the imagewise data into corresponding optical scanning systems.

* * * * *